No. 882,213.  
PATENTED MAR. 17, 1908.  
Z. N. SEELYE.  
SAW GAGE AND FILING TOOL.  
APPLICATION FILED APR. 17, 1906.

2 SHEETS—SHEET 1.

Witnesses  
Howard D. Orr  
H. F. Riley

Z. N. Seelye, Inventor,  
By E. G. Siggers  
Attorney

THE NORRIS PETERS CO., WASHINGTON, D. C.

No. 882,213. PATENTED MAR. 17, 1908.
Z. N. SEELYE.
SAW GAGE AND FILING TOOL.
APPLICATION FILED APR. 17, 1906.
2 SHEETS—SHEET 2.
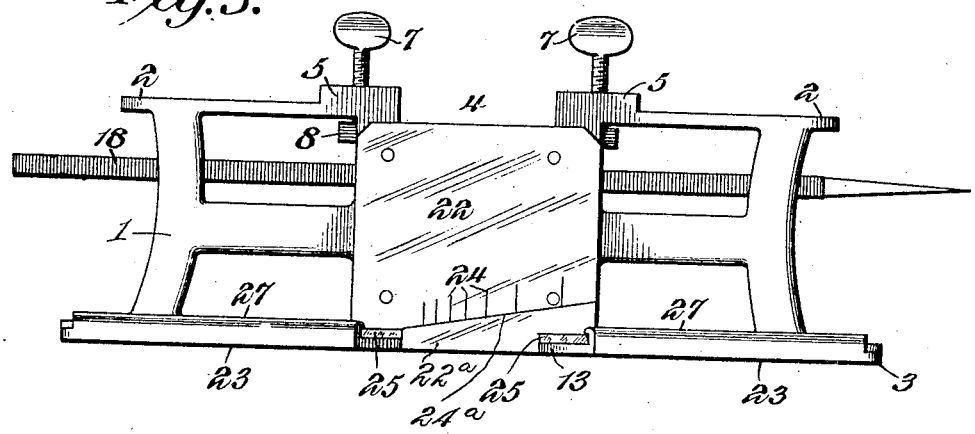
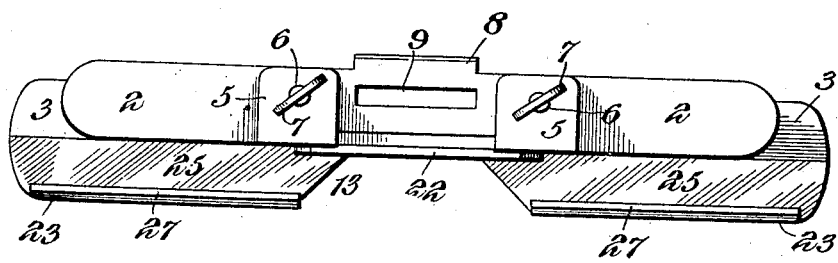
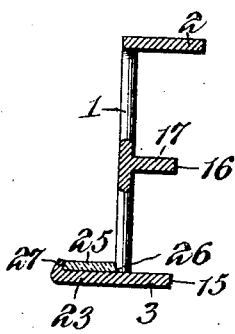
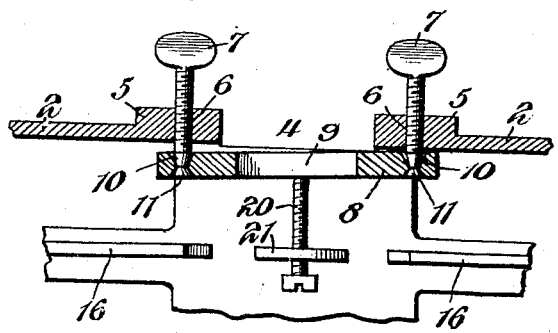
Z. N. Seelye, Inventor,
Witnesses
Howard D. Orr.
J. F. Riley
By E. G. Siggers
Attorney
THE NORRIS PETERS CO., WASHINGTON, D. C.

UNITED STATES PATENT OFFICE.

ZECHARIAH N. SEELYE, OF CENTRALIA, WASHINGTON.

SAW-GAGE AND FILING-TOOL.

No. 882,213.　　　　　Specification of Letters Patent.　　　Patented March 17, 1908.

Application filed April 17, 1906. Serial No. 312,259.

*To all whom it may concern:*

Be it known that I, ZECHARIAH N. SEELYE, a citizen of the United States, residing at Centralia, in the county of Lewis and State of Washington, have invented a new and useful Saw-Gage and Filing-Tool, of which the following is a specification.

The invention relates to improvements in saw gaging and filing tools.

The object of the present invention is to improve the construction of saw gaging and filing tools, and to provide a simple, inexpensive, and efficient one, adapted to firmly hold a file with its engaging face at right angles to the blade of a saw, for jointing the teeth of the same.

A further object of the invention is to provide a device of this character, adapted to form an efficient gage for swaging the raker teeth of a saw, and provided with means for enabling the teeth of the saw to be accurately dressed from the center or either end of the saw.

With these and other objects in view, the invention consists in the construction and novel combination and arrangement of parts, hereinafter fully described, illustrated in the accompanying drawings, and pointed out in the claims, hereto appended; it being understood that various changes in the form, proportion, size, and minor details of construction, within the scope of the claims, may be resorted to without departing from the spirit or sacrificing any of the advantages of the invention.

Figure 1:
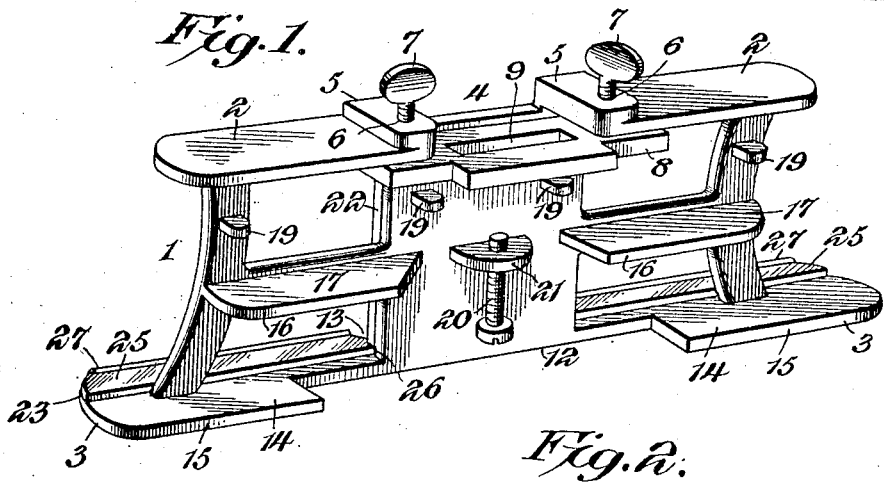
Figure 2:
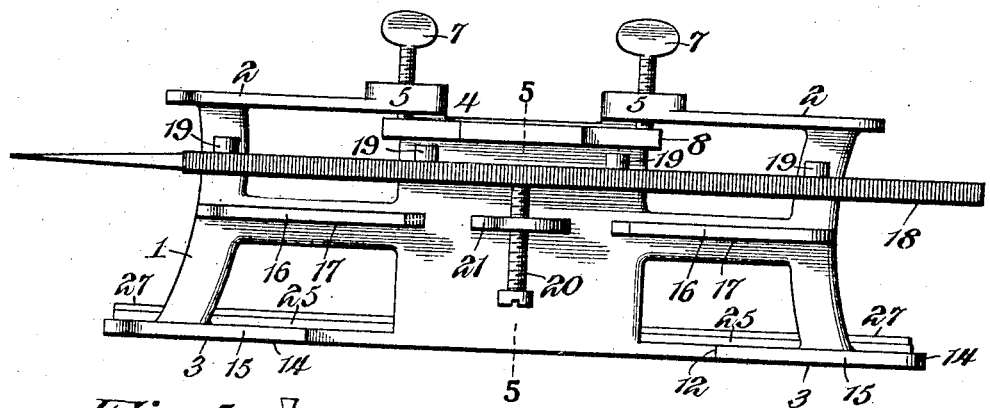
Figure 5:
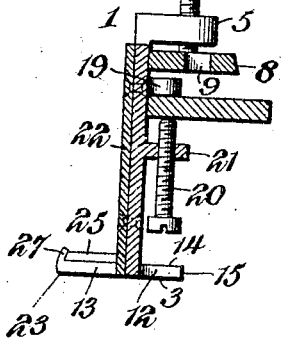
Figure 6:
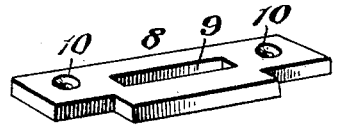

In the drawings:—Figure 1 is a perspective view of a saw gage and filing tool, constructed in accordance with this invention. Fig. 2 is an elevation of the same, illustrating the manner of clamping the file and jointing the teeth of a saw. Fig. 3 is an elevation, showing the opposite side of the saw gage and filing tool. Fig. 4 is a plan view. Fig. 5 is a transverse sectional view on the line 5—5 of Fig. 2. Fig. 6 is a detail perspective view of the adjustable file plate. Fig. 7 is a sectional view, illustrating the manner of mounting the adjustable file plate. Fig. 8 is a sectional view, illustrating the manner of securing the glass facing pieces in position.

Like numerals of reference designate corresponding parts in all the figures of the drawings.

1 designates a frame, which is preferably constructed of light cast metal, and which is provided in its body portion with openings to reduce the weight of the device and to lessen the cost of the same. The frame is provided at its side edges with longitudinal side flanges 2 and 3, which are formed integral with the body portion of the frame, and which extend from the same at right angles thereto. The side flange 2 extends from one of the side faces of the frame, and is arranged at the top of the same, when the device is used for either jointing or dressing the teeth of a saw. The flange 2 is cut away at the center, and is provided at opposite sides of the central opening or space 4 with enlargements or bosses 5, having threaded openings 6 for the reception of adjusting screws 7. The adjusting screws 7, which are in the form of thumb-screws, carry a file plate 8, which is adapted to be arranged either in a horizontal position or at an inclination, whereby the teeth of a saw may be filed and dressed from the center or either end of the blade. The file plate, which is constructed of case-hardened steel, or other suitable material, is provided with a central longitudinal slot 9, to receive the teeth, and it has suitable openings 10, in which are secured the lower ends 11 of the adjusting screws. The lower ends 11 of the adjusting screws are reduced and headed to retain the file plate on them, and the openings 10 of the file plate are countersunk or enlarged at the upper and lower faces of the plate which forms a loose swivel connection, to enable the plate, when adjusted by the screws, to assume either a horizontal or an inclined position. A number of saw blades require the point of the raker tooth leading from the center to the end of the blade, to be a fraction longer than the other point of the raker tooth, and the arrangement of the file plate at an inclination will enable the above result to be obtained. The file plate is adapted to be set for either filing the points of the raker teeth of uniform length, or for making one of the points of a length slightly in excess of the length of the other point.

The flange 3, which is located at the bottom of the body, when the device is arranged for dressing or jointing the teeth of a saw, extends from both of the side faces of the body portion of the frame, and is cut away at the center, at each side, to provide openings or spaces 12 and 13. The portions 14, which extend from the same face of the frame as the flange 2, have longitudinal guiding edges 15, which are arranged in the same plane as longitudinal guiding edges 16 of intermediate longitudinal ribs or flanges 17, formed integral with the frame and located at opposite sides of the center of the same, as clearly shown in Figs. 1 and 2 of the drawings. The guiding edges 14 and 16 are adapted to be placed against one of the faces of a saw blade for guiding the device thereon.

A file 18 is secured, with its lower engaging face at right angles, to the blade of the saw, by means of rigid central and end lugs 19, and a clamping screw 20. The clamping screw 20 is mounted in a threaded opening of an ear 21, which is located in the same longitudinal plane as the spaced longitudinal guiding ribs or flanges 17. The lugs 19, which are disposed in a longitudinal series, are spaced apart and are spaced from the ends of the guiding ribs or flanges 17, as clearly shown in Figs. 1 and 2 of the drawings. The file projects outward from the contiguous face of the body portion of the frame a sufficient distance to extend over the teeth of the saw blade, when the guiding flanges are fitted against one of the faces of the same. The clamping screw 20 is also adapted to be screwed through the ear 21 a sufficient distance to engage the file plate 8, and it coöperates with the adjusting screw 7 to firmly hold the file plate at any adjustment, as clearly illustrated in Fig. 7 of the drawings.

The opposite side face of the frame is provided with a gage plate 22, which coöperates with the laterally projecting portions 23 of the flange 3, to enable the raker teeth of a saw to be accurately swaged. The gage plate, which is preferably constructed of celluloid, or other suitable material, is relatively lighter in color than the frame of the tool, and it is provided with a reduced portion 22$^a$, extending outwardly into the space between the projecting portions 23. The gage plate is provided with an inclined gage line, arranged at an angle to the projecting portions 23 and extending inwardly from the reduced portion 22$^a$. The outer end of the gage line 24$^a$ is located adjacent to the inner end of one of the projecting portions 23, and graduations are arranged at suitable intervals along the gage line. The reduced projecting portion 22$^a$ of the gage plate enables the points of the saw teeth, projecting beyond the gage line, to be clearly seen. By means of the fixed gage, the teeth of a saw may be swaged any desired length without adjusting a screw, or any other part of the device. The projecting portions 23 are provided with glass facing pieces 25, which are fitted in dove-tailed grooves, whereby they are maintained securely in position, without employing cement, or similar fastening means. The dove-tailed grooves or ways of the portions 23 of the flange 3, are formed by slightly grooving the body portion of the frame at 26, and by means of narrow longitudinal ribs 27, which extend from the portions 23 of the flange 3, and which have angularly disposed inner faces to engage the glass facing pieces. The glass facing pieces have beveled side edges to fit the dove-tailed grooves or ways. The glass facing pieces enable the device to be moved over the teeth of a saw without injuring the same.

Having thus fully described my invention, what I claim as new and desire to secure by Letters Patent, is:

1. A device of the class described comprising a frame having spaced projecting flanges, adjusting screws mounted on the flanges at opposite sides of the space between the same, a file plate having a slot for the raker teeth of a saw and extending across the said space and carried by the adjusting screws and connected with each of the latter, whereby the file plate is adapted through the adjustment of the screws to assume different angles with relation to the same, said adjusting screws being also adapted to raise and lower either or both ends of the file plate for holding the same in a horizontal position to file the raker teeth to a uniform length or to set the file plate at an angle to file one of the raker teeth shorter than the other, and a screw mounted on the frame and arranged to engage the lower face of the file plate at a point between the ends thereof and coöperating with the said adjusting screws to rigidly clamp the file plate in its adjusted position.

2. A device of the class described comprising a frame having spaced projecting portions arranged to rest upon a saw blade, and a fixed gage plate located in the space between the said projecting portions and having an inclined gage line arranged at an angle to the said projecting portions, and graduations located at intervals along the gage line to enable the raker teeth to be swaged different lengths without adjusting the device.

3. A device of the class described comprising a frame having a flange cut away at an intermediate point to form projecting portions and to provide an intervening space, said projecting portions being adapted to rest upon a saw blade, and a fixed gage consisting of a plate secured to the frame and constructed of a material relatively lighter in color than the frame, said plate being provided with a reduced portion extending outwardly into the space between said projecting portions, an inclined gage line arranged at an angle to the projectng portions and extending inwardly from the reduced portion of the plate at the inner end of one of the said projecting portions, and graduations arranged at intervals along the gage line, said reduced portion of the plate extending beyond the gage line so that the teeth of a saw projecting beyond the gage line will be clearly visible.

In testimony, that I claim the foregoing as my own, I have hereto affixed my signature in the presence of two witnesses.

ZECHARIAH N. SEELYE.

Witnesses:
 JOHN A. LEAMAN,
 JAMES COX.